O. B. ROLLINS & J. W. HUDSON.
Check-Rower for Corn-Planter.

No. 221,615. Patented Nov. 11, 1879.

Witnesses.
A. Ruppert,
James H. Lange.

Orlando B. Rollins
John W. Hudson
Inventors.
per Edson Brothers
Attorneys.

UNITED STATES PATENT OFFICE.

ORLANDO B. ROLLINS AND JOHN W. HUDSON, OF WELLINGTON, ILLINOIS.

IMPROVEMENT IN CHECK-ROWERS FOR CORN-PLANTERS.

Specification forming part of Letters Patent No. 221,615, dated November 11, 1879; application filed August 13, 1879.

*To all whom it may concern:*

Be it known that we, ORLANDO B. ROLLINS and JOHN W. HUDSON, of Wellington, in the county of Iroquois and State of Illinois, have invented certain new and useful Improvements in Check-Rowers for Corn-Planters; and we do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1:
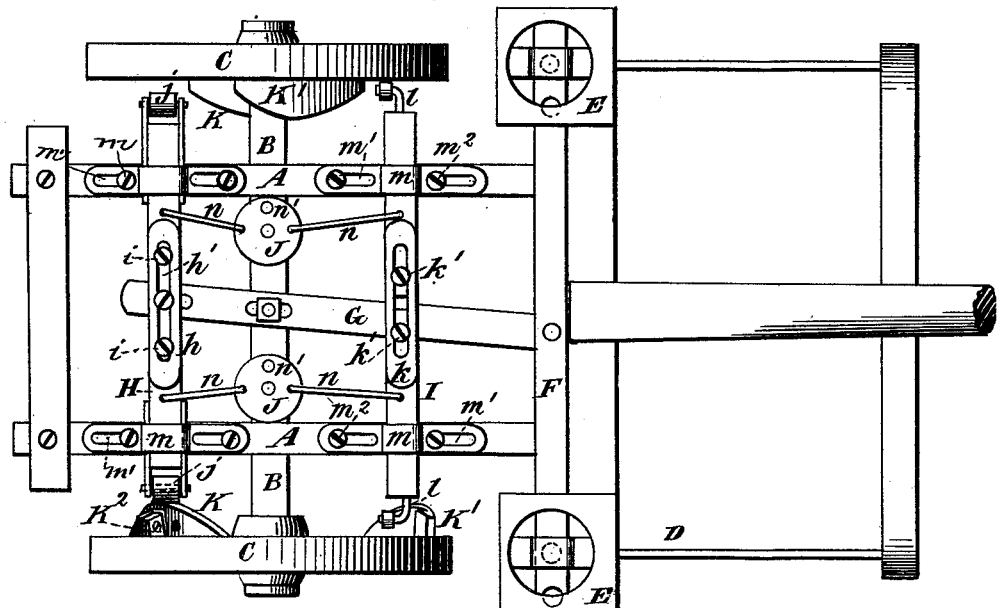
Figure 2:
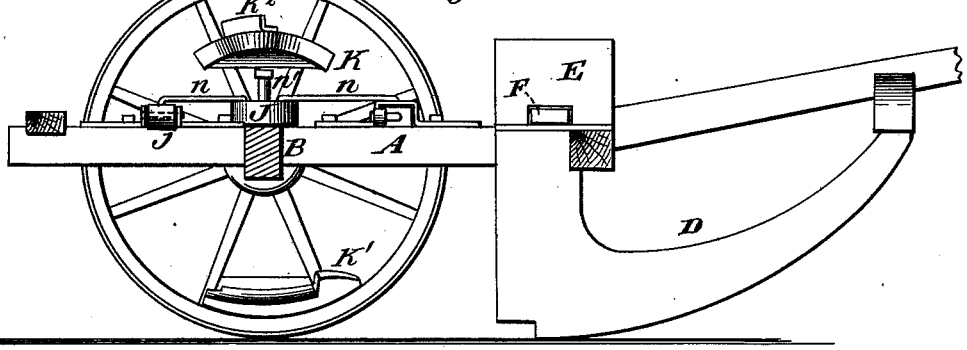
Figure 3:
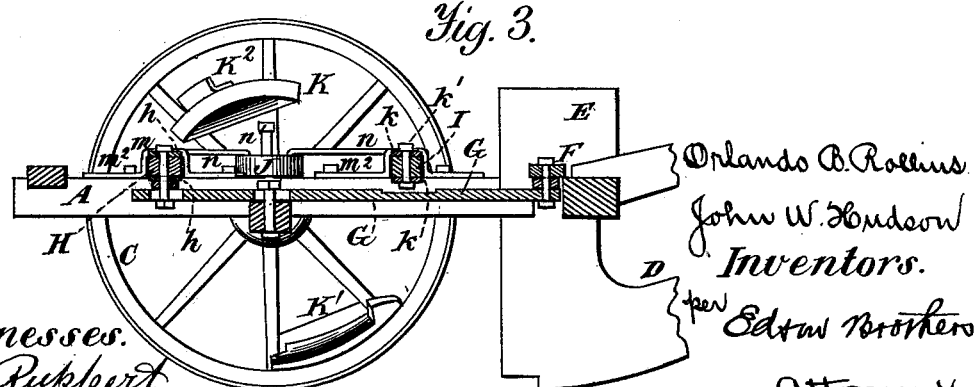

Figure 1 is a plan view of my improved corn or seed planter. Fig. 2 is a side elevation of the same, with one of its wheels removed; and Fig. 3 is a longitudinal central section thereof.

This invention relates to certain improvements in corn-planters; and it consists in the mechanism for dropping the corn, which mechanism is adapted to accommodate wide and narrow machines, and to be thrown in and out of engagement with the wheels, as hereinafter described, and more particularly pointed out in the claims.

In the accompanying drawings, A is the frame of the planter, consisting, essentially, of two side bars fastened together at their rear ends by a cross-bar. This frame is secured upon an axle, B, having wheels C C. To the forward ends of the bars A is a cross-piece provided with seed-boxes E, and depending from which are the usual legs or chutes for depositing the seed into the ground.

F is the dropper-bar, with its perforated ends working in the seed or corn boxes. G is a lever pivoted to and upon the axle, with one end connected to the dropper-bar, and its other end to the under side of the rear cross-bar, H. The bar H is made in two parts, which are connected together by extensible plates $h\ h$, one connected to the under side of said bar, and the other to the upper side of the bar. To render these parts of the bar extensible, to accommodate them to planters of different widths, the plates $h$ are provided with slots $h'$, which receive adjusting-screws $i$ from the parts of the bar. The ends of the bar H are provided with frictional rolls $j$, the function of which will appear hereinafter.

I is a second similar two-part bar, with like extensible plates $k$, and screws $k'$ entering the parts of the bar and extending up through slots in the plates, to adapt it to different widths of droppers. The ends of this bar are provided with hooks $e$, the purpose of which will be presently seen. Both these bars H I are adjusted to slide longitudinally on the side bars of the frame A in clips or staples $m$, with slotted arms $m'$, receiving headed projections $m^2$ from the frame A. The object of these motions is to permit the bars to be engaged by or disengaged from the propelling-wheels, as occasion may require. These bars are also connected by rods $n$ to disks or eccentrics J, provided with means (arms $n'$) for their operation, by which the aforesaid movements are imparted to the bars H I.

At about opposite points on each wheel C C are laterally-projecting cams K K', one cam, K, on each wheel, striking alternately the ends, respectively, of the bar H, giving the seed-bar the desired vibratory motion, and effecting the dropping of the seed or corn, while the cams K', on the opposite side of the wheels, are adapted to be engaged by the hooks on the ends of the bar I. The engagement of the bar I is necessary only under certain conditions. The cams K are also provided, on their inner sides, with projections $K^2$.

In the event the planter or dropper strikes an obstruction (or, rather, one wheel does) or sinks into a rut or depression in the ground, the tendency is to swing the planter around more or less obliquely to the intended path of the machine. The effect of this on the planter would be to drop the corn in uneven hills. To overcome this difficulty is the object of the bar I and its cams on the wheels. Now, it will be observed that as one or the other of the wheels passes down into a rut or hollow in or strikes an obstacle on the ground, the free wheel, after describing as much of an arc as its cam, with that end of the bar I, will allow, will be arrested by the engagement of the said cam and end of the bar I, until by such braking of the formerly free wheel equal pressure or draft will be brought on the sunken wheel. As continued draft is exerted on the sunken as well as the other wheel, such draft will, of course, return the swung-around wheel to its proper position in line with the other wheel, when the bar I will work free of the projection K², which formerly locked the bar I to the wheel, the sunk wheel, the moment of braking the free wheel, having been lifted by the draft out of its sunken position. The machine will, it is perceived, move along now in its intended path, or in a straight line, and permit the dropping of the corn or seed as before.

The hooks $e$ may be provided with anti friction rolls.

Having thus fully described our invention, we claim and desire to secure by Letters Patent—

1. In a corn or seed planter, the combination of the two-part extensible and contractible bars H I, connected to disks J by rods $n$, and swiveled bar G, substantially as and for the purpose set forth.

2. In a corn or seed planter, the combination, with cams on the propelling-wheels, of a bar or slide with its ends adapted to engage these cams and automatically brake the curving wheel when the other wheel is obstructed or in a sunken position, substantially as and for the purpose set forth.

3. In a corn or seed planter, the combination, with a longitudinally-sliding bar adapted to engage cams on the propelling-wheels, of eccentrics connected to said bar, substantially as and for the purpose set forth.

4. In a corn or seed planter, the combination, with the propelling-wheels having the cams K K', the cams K' having projections K² on their inner faces, of the seed-dropper-operating bars and a similar bar, each adapted to engage one set of said cams under the conditions aforesaid expressed, as and for the purpose described.

In testimony that we claim the foregoing as our own we affix our signatures in presence of two witnesses.

ORLANDO B. ROLLINS.
JOHN W. HUDSON.

Witnesses:
W. V. DOAN,
C. L. MEAD.